United States Patent [19]

Berkowitz et al.

[11] 4,196,077
[45] Apr. 1, 1980

[54] SEWAGE SLUDGE DEWATERING

[75] Inventors: Leonard Berkowitz, Miami, Fla.; Jerome Geyer, West Orange, N.J.; Alan Beerbower, Westfield, N.J.; William J. Asher, Fanwood, N.J.

[73] Assignee: Exxon Research & Engineering Co., Florham Park, N.J.

[21] Appl. No.: 633,378

[22] Filed: Nov. 19, 1975

Related U.S. Application Data

[63] Continuation-in-part of Ser. No. 482,247, Jun. 24, 1974, abandoned, which is a continuation of Ser. No. 278,272, Aug. 7, 1972, abandoned.

[51] Int. Cl.$^2$ .......................... C02B 1/04; C02B 1/20
[52] U.S. Cl. ..................................... 210/22 R; 210/54; 210/60; 210/71; 210/73 S; 210/74; 210/83
[58] Field of Search ................... 210/21, 22 R, 54, 60, 210/71, 73 S, 74, 83

[56] References Cited

U.S. PATENT DOCUMENTS

| | | | |
|---|---|---|---|
| 1,955,065 | 4/1934 | Hawley | 210/21 |
| 2,226,532 | 12/1940 | Hawley | 210/21 |
| 3,365,395 | 1/1968 | McDonald | 210/21 |

*Primary Examiner*—Charles N. Hart
*Assistant Examiner*—David R. Sadowski
*Attorney, Agent, or Firm*—John W. Ditsler; Roy J. Ott

[57] ABSTRACT

Substantial dewatering of a secondary sewage sludge stream is obtained by admixing same with various hydrocarbon oils, the initial sludge/oil weight ratio being maintained in an amount less than 0.6, at shear rates of at least 130 seconds$^{-1}$, and allowing the mixture thus formed to settle at temperatures of at least 72° F. Substantially complete disposal of the solids thus removed from the secondary sludge stream can be achieved by subjecting same to evaporation and incineration processes.

7 Claims, 1 Drawing Figure

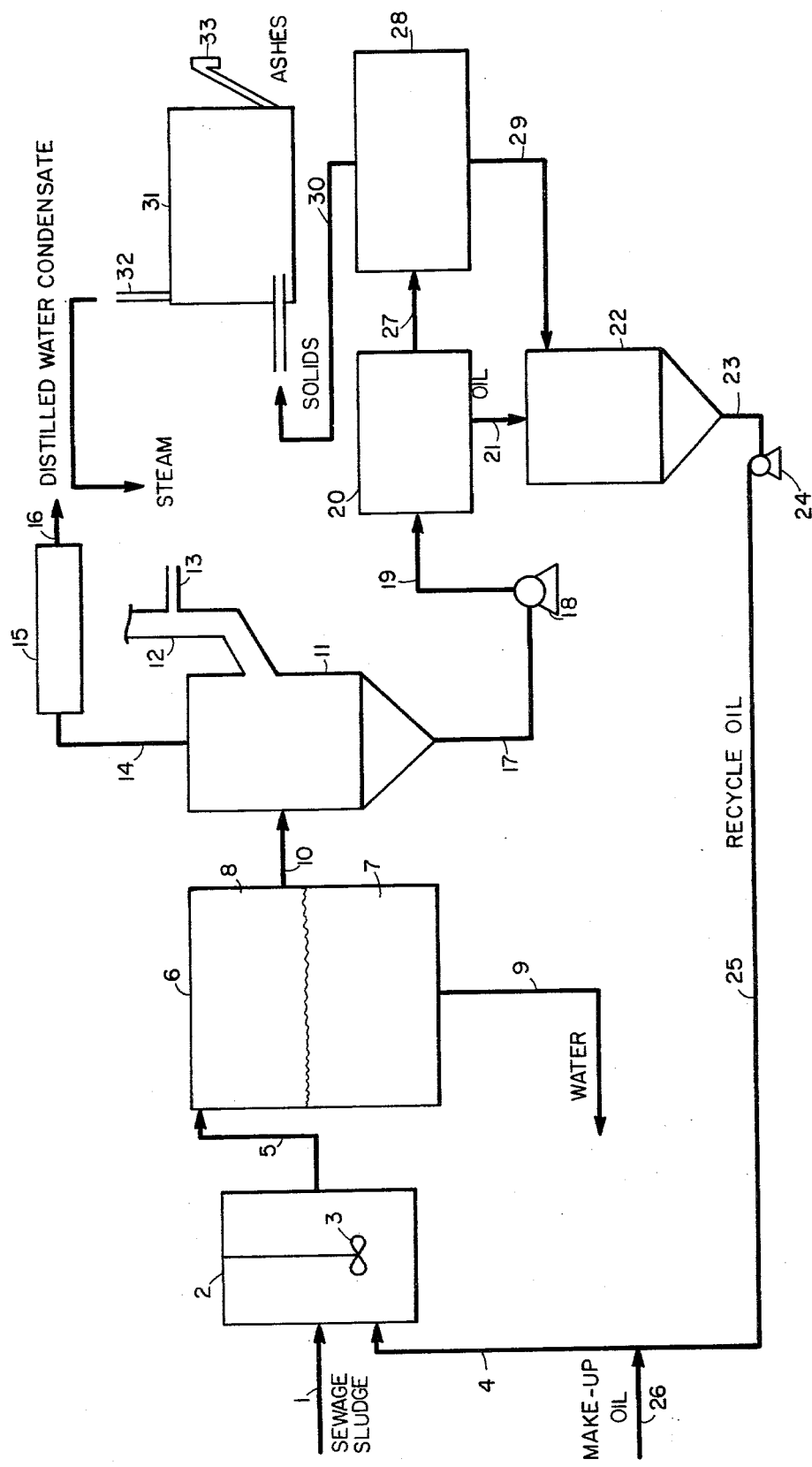

SEWAGE SLUDGE DEWATERING

CROSS-REFERENCE TO RELATED CASES

This is a continuation-in-part of application Ser. No. 482,247, filed June 24, 1974, which in turn is a continuation of application Ser. No. 278,272, filed Aug. 7, 1972, both applications now abandoned.

BACKGROUND OF THE INVENTION

1. Field of the Invention

The present invention relates to an improved method for removing solid waste materials from sewage sludges. More particularly, the invention relates to an improved method for concentrating secondary sewage sludges, alone or in combination with primary sewage sludges, to significantly higher solids content to facilitate disposal thereof. In another embodiment, the present invention relates to an integrated process for the disposal of solid materials contained in municipal sewage sludges in a manner more acceptable to the environment.

2. Description of the Prior Art

Suspended solids present in a raw or untreated municipal sewage stream are normally removed therefrom by passing said stream through a primary treating zone wherein a major portion of the solids contained therein is removed as a primary sewage sludge stream. If desired, the solids-depleted waste water effluent from the primary treating zone may then be passed to a secondary treatment zone for further purification, i.e. aerobic biological treatment followed by additional solids removal in the form of a secondary sewage sludge stream. This secondary sewage sludge typically comprises a gelatinous mass of dead and live organic matter, i.e., bacteria, which strongly resists further dewatering. Generally, the primary or secondary sludges are disposed of by dumping at sea, land fill subsequent to digestion by anaerobic decomposition, incineration, or letting the sludge set in ponds to evaporate.

The volume of sludge requiring disposal is enormous. For example, it has been estimated that the present average daily production of sludge is about 0.2 tons per thousand people on a dry basis. In view of our rising industrial production and expanding population, this figure is undoubtedly subject to further increase. Furthermore, sludge treatment and disposal is a very costly operation, representing up to about 50% of the total capital and operating costs of a sewage treatment plant.

Because of the technical and economic importance of the problem, industrialized countries have become increasingly aware of the need for developing more efficient and lower cost processed to treat and dispose of sewage sludges. However, with the present awareness and concern for environmental protection, all such processes must operate in a manner that causes little, if any, harm to the environment.

Several processes have been suggested for treating of sewage sludges. Among them are thickening (gravity settling, centrifugation, air flotation), stabilization (anaerobic and aerobic digestion, wet air oxidation, heat treatment) and dewatering (vacuum and pressure filtration, centrifugation). Any of the treatment processes can be combined with any of the disposal methods mentioned above. However, all treatment processes must handle the relative dilute sludges produced by the sewage treatment plant. Typically, primary sewage sludges will have a solids concentration between 2.5 and 5 wt. % while that of secondary sewage sludges will be between 0.5 and 3.0 wt. %. These concentrations represent water/solid ratios ranging between about 200/1 to about 20/1. Thus, regardless of the processes selected for treatment and disposal, there is an obvious economic incentive for concentrating, i.e., dewatering, said sludges prior to disposal to reduce the volume of material that must be processes and/or to minimize the quantity of water to be removed during said processing.

Examples of typical prior art processes are described in U.S. Pat. Nos. 1,955,065 and 2,226,532. In U.S. Pat. No. 1,955,065, sewage materials are treated by a lifting or gravitational process which utilizes mineral oils of the type frequently present in such waste waters to increase the buoyancy of certain objectionable substances contained therein, thus causing them to remain on the surface of the sewage stream for collection. U.S. Pat. No. 2,226,532 also discloses the "gentle" treatment of secondary (activated) sewage sludge with oil. However, the processes described in each patent are carried out at ambient temperatures upon sludges of undefined concentration, with an oil/"watery sludge" ratio of undefined value. Also, mixing of "watery sludge" and oil is carried out at undefined conditions of intensity, i.e. shear rate. Then the watery sludge mixture is allowed to separate into phases for an undefined period of time until there is finally produced an oil-sludge concentrate of undefined oil-solids-water composition with an undefined degree of capture of the sludge solids initially present in the oil.

Using actual sludges from the secondary treating zone of typical modern sewage plants, the process conditions actually described in U.S. Pat. Nos. 1,955,065 and 2,226,532 would not produce the degree of solids capture or the increase in solids concentration required for a practical, i.e. commercially viable, sludge recovery process.

In contrast, the high degree of solids capture associated with the present invention is based upon controlling the shear rate during mixing of the sewage sludge stream with the oil, the initial oil/sewage sludge weight ratio and the temperature at which the resulting oil-concentrated sludge mixture is settled.

It is thus the object of the present invention to upgrade the prior art processes to effect a substantial improvement in the concentration and/or elimination of solid materials contained in sewage sludge streams. It is another object of the present invention to provide an integrated process of significantly lower cost than previously known for the concentration and disposal of waste water sewage sludges. It is a further object of the present invention to provide such a process without causing any substantial harm to the environment.

SUMMARY OF THE INVENTION

Now according to the present invention, it has been discovered that these and other objects may be accomplished by the relatively simple and inexpensive utilization of certain petroleum hydrocarbon oils. More particularly, it has been found that if said hydrocarbon fractions are intimately mixed, i.e. mixed at shear rates of at least 130 seconds$^{-1}$, with a secondary sewage sludge stream such that the initial oil/sludge weight ratio is maintained in an amount less than 0.6 and the resulting mixture is allowed to settle at temperatures of at least 72° F., there results a significant concentration of the solid materials contained in said sludge stream and a concomitant dewatering of same. The oil-concentrated sludge thus formed has a significantly reduced water content, i.e. at least 85% of the suspended solids present in the sludge. The substantial elimination of the solids present in the oil-concentrated sludge may then be effected by subjecting same to evaporation and incineration processes.

BRIEF DESCRIPTION OF THE DRAWING

The single FIGURE is a diagrammatic view of an overall integrated procedure for the elimination and disposal of solids present in a secondary sewage sludge stream, including the process of the present invention.

DESCRIPTION OF THE PREFERRED EMBODIMENT

Having thus described the invention in general terms reference is now made to the single FIGURE. It is to be understood that the Figure is shown only in such details as is necessary for a clear understanding of the invention and that no intention is made thereby to unduly limit the scope of said invention. Variations obvious to those having ordinary skill in the art of municipal waste water treating processes are included in the broad scope of the invention.

Referring now to the Figure, a secondary sewage sludge stream is introduced via line 1 into a mixing zone 2 containing a suitable mixing device 3 and is contacted with a hydrocarbon oil stream which is introduced into said mixing zone through line 4. The secondary sewage sludge stream may also contain some primary sewage sludge not separated from the waste water in the primary treating zone such as might occur during times of peak loading. In addition, at least a portion of the primary sewage sludge stream may be combined with the secondary sewage sludge stream if desired. Thus, the term "secondary sewage sludge" as used herein refers to a stream comprising predominantly, i.e. at least 51 wt. %, secondary sewage sludge and a minor amount, i.e. less than 50 wt. %, of primary sewage sludge.

A wide range of petroleum derived hydrocarbon oils has been found to be effective for the sludge concentration process of the present invention. Examples of suitable hydrocarbon oils include heating oils, solvents, lube oil base stocks, etc., each with widely differing physical properties and chemical compositions. However, it is preferred that the hydrocarbon oils have (1) a flash point of at least 25° F. above the processing temperature to minimize fire and air pollution hazards, (2) a viscosity less than 200 and preferably less than 60 centistokes at the processing temperature to assure intimate mixing, and (3) a specific gravity less than 0.95 and preferably less than 0.90 at the processing temperature to promote rapid settling. The hydrocarbon oils can be derived from petroleum products including products derived in part from petroleum sources. Suitable hydrocarbon oil fractions can also be derived from shale oil kerogen or tar sands bitumen processing, synthetic oils, coal hydrogenation and the like. Thus, the choice of oil to be used can be made on the basis of cost, availability and process considerations.

It has been found that neither maximum concentration of the sewage sludges nor complete capture of the sludge solids in the concentrate phase described hereinafter are obtained unless the rate of shear during mixing is above about 130 seconds$^{-1}$. Such intimate contacting and admixing of the sludge and oil streams is accomplished by utilizing mixing device 3, which can be any suitable means for mixing the two streams under high shear. A centrifugal pump is a preferred mixing device.

The mixing should be carried out so that the oil/sludge weight ratio is maintained in an amount less than 0.6 and is in the range of from 0.1 to 0.4, preferably from 0.15 to 0.2.

The intimately admixed mixture is then passed through line 5 into settling zone 6, which may comprise one or more settling stages, wherein the mixture is allowed to settle into a lower phase 7 comprising water and an upper phase 8 comprising an intimate emulsion of oil-concentrated (partially dewatered) sludge and water. It is preferred that the two-phase system be maintained in a relatively quiescent condition for settling times of up to about 24 hours although shorter settling times may be employed. In addition, the temperature in at least the final settling stage, where more than one is employed, should be maintained at above ambient temperatures, i.e. above 72° F., preferably above 100° F., and more preferably in the range of from about 100° to about 180° F., since high solid concentrations are obtainable in less settling time at such temperature conditions. However, the exact temperature employed will vary according to an economic balance between settling time and heating costs. The water phase 7 will be relatively clear, containing only minor amounts of sludge materials, i.e. typically from about 0.2 to 15 wt. %, most preferably less than 1 wt. %, of the initial feed solids. Thus, at least 85 wt. %, preferably at least 95 wt. %, and most preferably at least 99 wt. % of the sludge materials present in the feed will be present in oil-concentrated sludge phase 8. Water phase 7 may then be withdrawn from the settling zone 6 through line 9 for use in any desirable manner, e.g. being returned to the primary effluent (not shown) for further treatment therein or, if suitable, to the secondary effluent for discharge to the environment.

The above describes a sludge preconcentrating step for dewatering sewage sludges to a solids content which is easily handled in a variety of sludge solids disposal configurations and procedures. One such configuration is shown in the remainder of the Figure and will be described in more detail hereinbelow. While other such procedures may be employed, the particular combination described has been found to result in a substantially complete disposal of solid materials contained in the sewage sludges described herein, while meeting the objects of the present invention.

The oil-concentrated sludge phase 8 from the settling zone 6 may then be further concentrated. However, it is quite difficult to separate the concentrated sludge, oil, and water emulsion therein by settling, centrifugation, or filtration processes. The separation may be made more easily if one of the components, e.g. water, is removed therefrom and the sludge separated from the remaining oil-concentrated sludge mixture. Thus, as shown in the Figure, the oil-concentrated sludge mixture is introduced via line 10 into a single effect evaporator 11 which utilizes a steam-containing vapor introduced into the upper chamber 12 of said evaporator via line 13 for contact with the oil-concentrated sludge contained therein. Although a single effect evaporator is shown, the use of a multi-effect evaporator is contemplated. The steam-containing vapor, which in a multi-effect evaporator would be supplied from a subsequent evaporating stage, is used as a heating medium for the initial stage. The presence of the oil in phase 8 has been found to facilitate the further drying of the sewage sludge in evaporator 11. For example, the oil alleviates the problem of poor heat transfer rates which normally occurs in the latter stages of a multi-effect evaporator wherein the fluidity of the material being processed is reduced drastically. Additionally, the oil aids in the prevention of evaporative scaling. Thus, the particular integration of processes shown in the Figure is highly compatible and takes full advantage of the processes employed therein.

Water vapor is removed from the evaporator 11 via line 14 and may be condensed in a condenser 15 from which a condensate is discharged through line 16. Subsequent to substantially complete evaporation of the water from the oil-concentrated sludge mixture, the oil-dewatered sludge mixture thus formed is removed from evaporator 11 through line 17 and is passed via pump 18 through line 19 to separation zone 20, such as a centrifuge, for separation of the oil therefrom. The oil thus removed from the oil-dewatered sludge mixture in the separation zone 20 is sent through line 21 to a recycle oil tank 22 from which said oil may be recycled to the mixing zone 2 via line 23, pump 24, line 25, and line 4 for further use in dewatering the secondary sewage sludge stream. Make-up oil may be added to the recycle stream through line 26, if needed. Following configuration, additional oil may be removed, if desired, from the oil-dewatered sludge stream by passing same via line 27 to a recovery zone 28 which contains conventional oil recovery processes, e.g. solvent extraction, steam stripping, screw pressing, etc. Alternately, the oil-dewatered sludge stream could be sent directly to combustion zone 31. The oil so recovered is removed from recovery zone 28 via line 29 and sent to the recycle oil tank 22.

Substantially oil-free and water-free solids are then discharged from recovery zone 28 and passed through line 30, preferably via a conveyor system, to a combustion zone 31, e.g. a boiler or furnace, capable of using said solids as fuel to produce steam. The steam thus formed is removed through line 32 and, if desired, may be introduced into the evaporator 11 via line 13 as shown. Ashes remaining from the combustion of the solids are removed from the combustion zone 31 via line 33 for disposal.

The following examples are presented to illustrate further the process of the present invention and are not intended to restrict unduly the limits of the claims appended hereto.

EXAMPLE 1

Effect of Mixing Shear Rate on Solids Capture

Several runs were made using various secondary sludges and three mixing devices to determine the shear rate required for acceptable solids capture, using 0.2 lb. of #4 H.O. per lb. dry solid. The devices employed were (1) a turbine agitator in a 400 gm plastic beaker having two ¼ inch steel baffles, (2) a 600 rpm, 1/20 H.P. centrifugal pump drawing from a 1000 gm. laboratory kettle at a rate of about 100 gm/sec. and (3) a 1/5 H.P., 1 liter capacity Waring Blender (Model 22-1540 in Ace Scientific Laboratory Supply Catalogue 70). Shear rates were calculated according to the following expression:

$$\text{Shear Rate, sec}^{-1} = \frac{3.14\,(RPS)\,(D)}{C}$$

where
RPS = revolutions per second
D = impeller diameter, cm
C = clearance between impeller tip and mixing chamber wall or tips of baffles, cm.

The results from the above tests are summarized in Table 1 below:

TABLE 1

| Mixing Device | Solids in Feed, wt. % | Shear Rate, sec$^{-1}$ | Solids Capture wt. % (1) |
|---|---|---|---|
| Turbine | 0.5 | 75 | ~60 |
| Turbine | 0.8 | 130 | 80-90 |
| Turbine | 1.5 | 130 | 95 |
| Turbine | 2.3 | 130 | 98 |
| Centrifugal pump | ≧0.5 | 73,000 | 98+ |
| Waring Blender | ≧0.5 | 219,000 | 98+ |

(1) Solids capture refers to the wt. % of the solids in the sewage sludge feed which are transferred to oil-concentrated sludge (phase 8 in the Figure).

This Example shows that solids capture increases markedly with increased shear rate and that shear rates of at least 130 seconds$^{-1}$ are required to obtain an acceptable; i.e. at least 85 wt. %, solids capture.

EXAMPLE 2

Effect of Hydrocarbon Oils on Concentration Factor

Samples of various secondary sewage sludges were admixed with various amounts of hydrocarbon oils, the properties of which are shown in Table 2 below. The mixture was then allowed to settle in either a 250 cc or a 500 cc straight sided dropping funnel for standard test times of about 1 hour and about 20 hours in a constant temperature oven. The results of these experiments are shown in Table 3 below.

TABLE 2

| Oil | Specific Gravity 60° F. | Composition, Vol. % | | | | | Distillation °F. | | | Flash Point °F. | Viscosity |
|---|---|---|---|---|---|---|---|---|---|---|---|
| | | Paraffins | Naphthenes | Aromatics Total | C$_8$+ | Olefins | IBP | 50% | Dry | | |
| #2 Heating Oil | .87 | 38 | 30$^1$ | 32 | | | 335 | 499 | 648 | 158 | 2.3cs at 100° F. |
| #4 Heating Oil | .884 | | | | | | 342 | 577 | 860 | 200 | 50SSU at 100° F. |
| Varsol #1 | .789 | 46.1 | 39.8 | 14.0 | 13.0 | 0.1 | 319 | 342 | 380 | 105 | 0.92cp at 77° F. |
| LOPS$^2$ | .796 | 54.3 | 43.3 | 2.4 | | | 383 | 426 | 474 | 152 | 1.2cs at 100° F. |
| Lube Oil | .901 | | 69.5 | 30.5 | | | | | | 310 | 80SSU at 100° F. |

$^1$Napthenes + Olefins
$^2$Low Odor Paraffin Solvent

TABLE 3

| Solids in Feed, wt. % | Oil/Sludge wt. Ratio | Settling Temperature, °F. | Mixing Device | Oil | Concentration Factor[1] 1 Hr. | 20 Hr. |
|---|---|---|---|---|---|---|
| 1.5 | 0.4 | 176 | Turbine | #4 H.O. | 1.6 | 2.3 |
|  |  |  |  | LOPS | 1.5 | 2.1 |
| 0.55 | 0.2 | " | Waring Blender | #4 H.O. | 4.5 | 8.1 |
|  |  |  |  | #1 Varsol | 2.9 | 6.7 |
| 1.65 | 0.2 | " | " | #4 H.O. | 2.1 | 3.3 |
|  |  |  |  | #1 Varsol | 1.7 | 4.0 |
| 1.65 | 0.6 | " | " | #4 H.O. | 1.4 | 3.0 |
|  |  |  |  | #1 Varsol | 1.4 | 3.0 |
|  |  |  |  | #2 H.O. | 1.3 | 2.7 |
| 2.35 | 0.2 | " | " | #4 H.O. | 1.3 | 2.0 |
|  |  |  |  | #1 Varsol | 1.1 | 2.0 |
| 0.82 | 0.2 | " | " | #4 H.O. | 5.8 | 8.2 |
|  |  |  |  | Lube Oil | 3.8 | 8.2 |
| 2.3 | 0.2 | " | " | #4 H.O. | 2.5 | 4.2 |
|  |  |  |  | Lube Oil | 1.5 | 2.7 |
|  |  |  |  | #1 Varsol | 2.6 | 4.6 |
| 1.88 | 0.2 | " | " | #4 H.O. | 1.5 | 2.8 |
|  |  |  |  | #1 varsol | 1.3 | 2.3 |
|  |  |  |  | LOPS | 1.4 | 2.6 |
| 2.3 | 0.2 | 140 | " | #4 H.O. | 1.7 | 2.9 |
|  |  |  |  | #1 Varsol | 2.0 | 3.3 |

[1]Concentration Factor refers to the wt. % solids in the water portion of the oil-concentrated sludge phase (phase 8) divided by the wt. % solids in the sewage sludge feed.

Thus, if a sewage sludge containing 100 lbs. of sludge in 10,000 pounds of water is mixed with 49 lbs. of oil, there will be formed an oil-concentrated sludge phase (phase 8) containing, for example, 98 lbs. of sludge, 1000 lbs. of water and 49 lbs. of oil and a water phase (phase 7) containing 2 lbs. of sludge and 9000 lbs. of water. For this particular example, the solids capture will be 98 wt. %, the oil/sludge weight ratio will be 0.5, and the concentration factor will be 9.8 wt. %/1.0 wt. % or 9.8. Therefore, 99% of the water is removed from the sewage sludge.

EXAMPLE 3

Effect of Settling Temperature on Concentration Factor

The procedure of Example 2 was followed except that the indicated sludges were admixed using a centrifuged pump with #4 heating oil only. The mixture was then allowed to settle as before with measurements being made at about 1 hour and between 17 and 21 hours (typically 20 hours). The results obtained are summarized in Table 4 below.

TABLE 4

| Sludge | Solids in Feed, wt. % | 77° F. 1 hr | 77° F. 17/21 | 104° F. 1 hr | 104° F. 17/21 | 113° F. 1 hr | 113° F. 17/21 | 122° F. 1 hr | 122° F. 17/21 | 140° F. 1 hr | 140° F. 17/21 | 176° F. 1 hr | 176° F. 17/21 | 203° F. 1 hr | 203° F. 17/12 |
|---|---|---|---|---|---|---|---|---|---|---|---|---|---|---|---|
| Secondary | 1.0 | — | — | — | — | — | — | — | — | — | — | 3.1 | 6.8 | 3.2 | 1.0 |
| " | 1.8 | — | — | — | — | — | — | — | — | — | — | 2.0 | 3.5 | 2.2 | 3.6 |
| " | 0.52 | — | — | 8.1 | 13.3 | — | — | — | — | 9.5 | 14.9 | 11.8 | 18.3 | — | — |
|  | 2.1 | — | — | 1.4 | 2.6 | — | — | — | — | 1.6 | 3.4 | 2.1 | 3.7 | — | — |
| " | 0.7 | — | — | 4.3 | 8.5 | — | — | — | — | 4.0 | 9.8 | 5.8 | 16.0 | — | — |
|  | 3.0 | — | — | 1.2 | 2.2 | — | — | — | — | 1.2 | 2.4 | 1.4 | 3.0 | — | — |
| " | 0.5 | — | — | 6.4 | 12.9 | — | — | — | — | 11.8 | 18.4 | — | — | — | — |
|  | 2.2 | — | — | 2.0 | 4.0 | — | — | — | — | 3.0 | 4.4 | — | — | — | — |
| " | 0.59 | — | — | — | — | — | — | 5.5 | 9.2 | — | — | 6.8 | 15.9 | — | — |
|  | 1.75 | — | — | — | — | — | — | 1.3 | 3.5 | — | — | 1.8 | 3.8 | — | — |
| " | 1.2 | — | — | — | — | — | — | — | — | 2.9 | 4.1 | 3.2 | 5.5 | — | — |
| Primary & Secondary | 3.5 | — | — | — | — | — | — | 1.1 | 2.1 | — | — | 1.2 | 2.1 | — | — |
| " | 2.1 | 1.4 | 2.7 | — | — | — | — | — | — | — | — | 1.9 | 5.2 | — | — |

This example shows that the concentration factor increases with increasing settling temperature.

EXAMPLE 4

Effect of Oil/Sludge Ratio in Concentration Factor

The procedure of Example 2 was followed, using the sludges, oils and mixing devices shown in Table 5 below. The results obtained therefrom are also shown in Table 5.

TABLE 5

| Sludge | Solids in Feed, wt. % | Oil | Settling Temperature, °F. | Mixing Device | Oil/Sludge wt. Ratio | Concentration Factor 1 hr | 20 hr |
|---|---|---|---|---|---|---|---|
| Secondary | 0.55 | #1 Varsol | 176 | Waring Blender | .1 | 4.5 | 8.1 |
|  |  |  |  |  | .2 | 2.9 | 6.7 |
|  |  |  |  |  | .4 | 2.8 | 6.0 |
| " | " | #4 H.O. | " | " | .1 | 6.4 | 11.2 |
|  |  |  |  |  | .2 | 4.5 | 8.1 |
|  |  |  |  |  | .4 | 4.2 | 8.1 |

TABLE 5-continued

| Sludge | Solids in Feed, wt. % | Oil | Settling Temperature, °F. | Mixing Device | Oil/Sludge wt. Ratio | Concentration Factor 1 hr | Concentration Factor 20 hr |
|---|---|---|---|---|---|---|---|
| " | 1.65 | #4 H.O. | " | " | .1 | 2.0 | 2.9 |
|  |  |  |  |  | .2 | 2.1 | 3.3 |
|  |  |  |  |  | .4 | 1.8 | 3.3 |
| " | 1.65 | #1 Varsol | " | " | .1 | 1.7 | 4.2 |
|  |  |  |  |  | .4 | 1.6 | 3.7 |
| " | 2.35 | #4 H.O. | " | " | .1 | 1.3 | 1.7 |
|  |  |  |  |  | .2 | 1.3 | 2.0 |
|  |  |  |  |  | .4 | 1.0 | 1.7 |
| " | 2.35 | #1 Varsol | " | " | .1 | 1.2 | 2.3 |
|  |  |  |  |  | .2 | 1.1 | 2.0 |
| Primary & Secondary | 2.7 | #4 H.O. | " | " | .1 | 2.4 | 4.0 |
|  |  |  |  |  | .2 | 2.6 | 4.5 |
| Secondary | 1.9 | #4 H.O. | " | Centrifugal Pump | .1 | 2.4 | 5.1 |
|  |  |  |  |  | .2 | 2.8 | 4.5 |
|  |  |  |  |  | .4 | 2.2 | 3.8 |
| " | 1.9 | #4 H.O. | " | " | .1 | 2.3 | 5.2 |
|  |  |  |  |  | .2 | 2.9 | 4.8 |
|  |  |  |  |  | .4 | 2.8 | 4.5 |

This example, along with the data in Table 3, shows that the oil/sludge weight ratio should be maintained in an amount less than 0.6 and preferably in the range of 0.1 to 0.4. This example, along with the data in Tables 3 and 4, also shows that the concentration factor increases with increasing settling time.

What is claimed is:

1. A method for dewatering a stream containing predominantly secondary sewage sludge, said sludge containing solid materials entrained therein, which comprises (1) admixing said stream with a hydrocarbon oil at shear rates of at least 130 seconds$^{-1}$, the weight ratio of said hydrocarbon oil to said sludge being maintained in an amount of less than about 0.6, (2) settling said mixture at a temperature of at least 72° F. into a lower phase comprising water and an upper phase of substantially reduced water content comprising said hydrocarbon and said solid sludge materials, and (3) separating said upper phase therefrom, at least 85 wt. % of the solid materials entrained in the sewage sludge being present in said upper phase.

2. The method of claim 1 wherein the ratio of said hydrocarbon oil to said sludge ranges from about 0.1 to about 0.4.

3. The method of claim 2 wherein said upper phase from step (2) is treated subsequently by the steps of (a) evaporation in at least one evaporator, utilizing steam as the evaporative heating source, to remove a substantial amount of the water therein, (b) centrifugation, to separate said hydrocarbon oil from said dried solid sludge materials, and (c) burning to dispose of said substantially liquid-free solid sludge materials.

4. The method of claim 3 wherein the ratio of said hydrocarbon oil to said sludge ranges from about 0.1 to about 0.2.

5. The method of claim 2 wherein the settling is effected at a temperature in the range of from about 100° to about 180° F.

6. The process of claim 2 wherein at least 95 wt. % of the solids present in the sewage sludge stream are present in said upper phase.

7. The method of claim 2 wherein said upper phase from step (2) is treated subsequently by the steps of (a) evaporation in at least one evaporator, utilizing steam as the evaporative heating source, to remove a substantial amount of the water therein, (b) centrifugation, to separate said hydrocarbon oil from said dried solid sludge materials, and (c) burning to dispose of said substantially liquid-free solid sludge materials.

* * * * *